United States Patent [19]
Ogawa

[11] Patent Number: 5,272,728
[45] Date of Patent: Dec. 21, 1993

[54] PREAMBLE LENGTH ADJUSTMENT METHOD IN COMMUNICATION NETWORK AND INDEPENDENT SYNCHRONIZATION TYPE SERIAL DATA COMMUNICATION DEVICE

[76] Inventor: Fumio Ogawa, c/o Fuji Xerox Co., Ltd., KSP R&D Business Park Building, 100-1, Sakado, Takatsu-ku, Kawasaki-shi, Kanagawa, Japan

[21] Appl. No.: 670,933

[22] Filed: Mar. 18, 1991

[30] Foreign Application Priority Data

Mar. 20, 1990 [JP] Japan ................................. 2-70563

[51] Int. Cl.$^5$ ............................................. H04L 7/04
[52] U.S. Cl. ..................................... 375/110; 375/118
[58] Field of Search ............... 375/106, 107, 108, 112, 375/118, 110; 370/82, 99, 102, 108; 369/60

[56] References Cited

U.S. PATENT DOCUMENTS

| | | | |
|---|---|---|---|
| 4,849,969 | 7/1989 | Annamalai | 370/108 |
| 4,849,970 | 7/1989 | McCool | 370/108 |
| 5,018,171 | 5/1991 | Perloff et al. | 370/85.5 |

*Primary Examiner*—Curtis Kuntz
*Assistant Examiner*—T. Ghebretinsae

[57] ABSTRACT

In a conventional case where a preamble length is adjusted in a communication network, even if there is a frame (cycle) in which the length of the preamble has already been adjusted by a preceding station in the direction in which it is increased or decreased, if it is determined on the basis of the decision conditions of an active station that the length of the preamble of such a frame should be increased or decreased, the length of the preamble is adjusted in the direction in which it is further increased or decreased. However, according to the present invention, the length of each preamble which is inputted to a buffer is monitored, and if it is determined that the preamble length of a frame has already been adjusted in the same increasing or decreasing direction, adjustment of the preamble length of the frame is inhibited and such adjustment is carried forward to a succeeding frame. If it is determined that the preamble length of the succeeding frame has also already been adjusted in the same increasing or decreasing direction, the adjustment of the preamble length of the frame is further carried forward to a following frame. Accordingly, repetition of preamble length adjustment with respect to the same frame is prevented, so that resistance to data destruction can be remarkably improved.

2 Claims, 10 Drawing Sheets

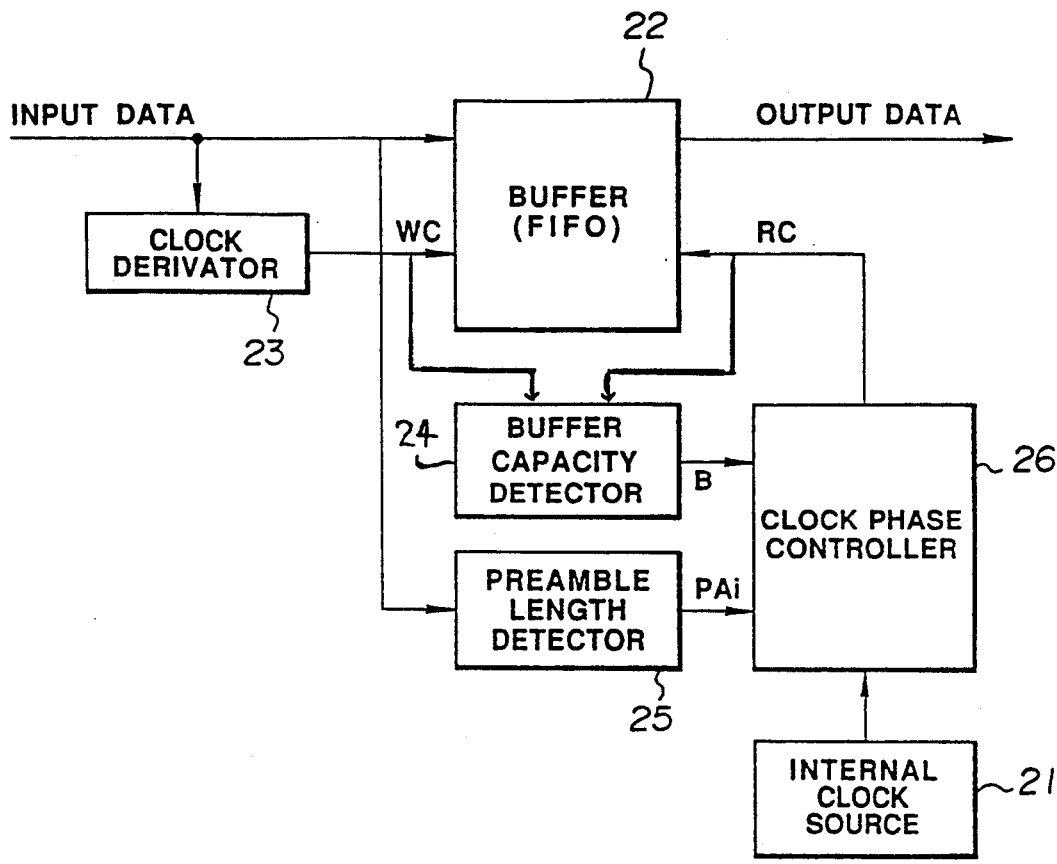

| MODE | MODE SETTING | | QA | QB | QC |
| --- | --- | --- | --- | --- | --- |
| | S0 | S1 | | | |
| NORMAL SHIFT | L | H | — | QAn | QBn |
| SKIPPING OF READING | H | H | QBn | QCn | — |
| DOUBLE READING | L | L | QAn | QBn | QCn |

FIG.10
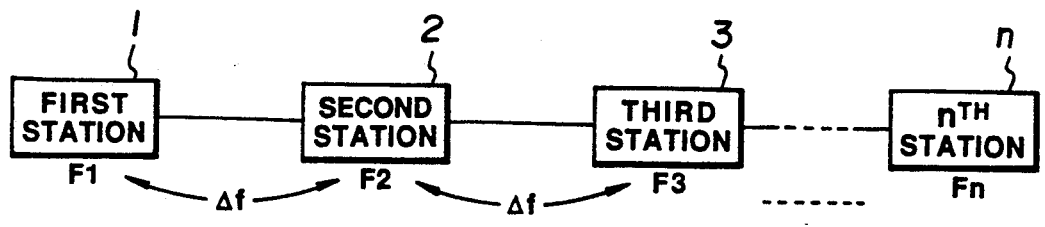
FIG.11
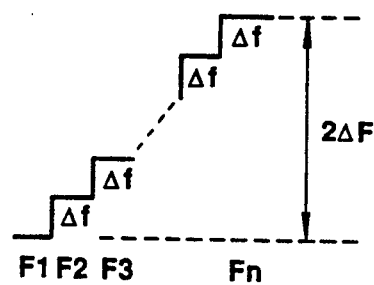
FIG.12(a)   FIG.12(b)
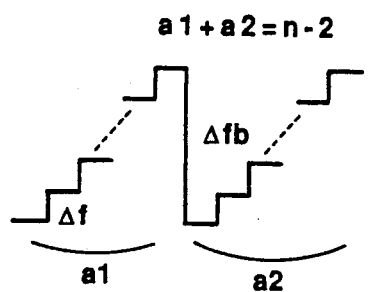 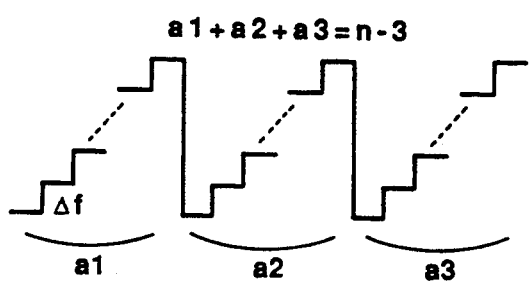
FIG.13
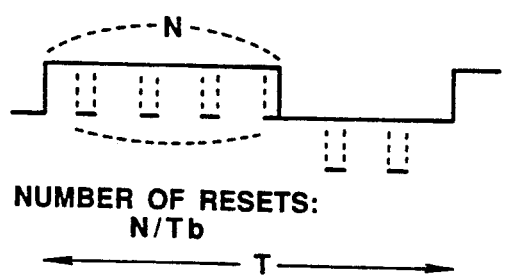

FIG.14

| | SIMULATION CONDITION | LIMIT SMOOTHER | CENTERING SMOOTHER | EMBODIMENT DEVICE |
|---|---|---|---|---|
| 1 | 1000 STATIONS 8192cycles<br>STATION CLOCK DEVIATION: ±50ppm RAMDOM | PA≦1  0.0067%<br>(DATA LOSS) | PA≦2 NOTHING<br>PA=3.7  0.067% | ALL<br>4≦PA≦6 |
| 2 | 100 STATIONS 8192cycles<br>STATION CLOCK DEVIATION:<br>0,-10,-20~50,<br>0,10,20~50ppm<br>REPEAT | | PA≦1  3%<br>(DATA LOSS) | ALL<br>4≦PA≦6 |
| 3 | 1000 STATIONS 8192cycles<br>STATION CLOCK DEVIATION:<br>-100,-99,-98~-1.0,<br>-2~100 100,99,98~<br>1.0,-1,-2~-100<br>REPEAT | | | ALL<br>4≦PA≦6 |
| 4 | 1000 STATIONS 3000000cycles<br>CLOCK: ±50ppm RAMDOM | | | ALL<br>4≦PA≦6 |

PREAMBLE LENGTH ADJUSTMENT METHOD IN COMMUNICATION NETWORK AND INDEPENDENT SYNCHRONIZATION TYPE SERIAL DATA COMMUNICATION DEVICE

BACKGROUND OF THE INVENTION

1. Field of the Invention

The present invention relates to a preamble length adjustment method in a communication network and an independent synchronization (independent point-to-point clocking) type serial data communication device which adopts such a preamble length adjustment method. More particularly, the present invention relates to implementation of a method and device which can maintain a preamble added to each frame of serial data within a range of suitable lengths at all times in any case.

2. Description of the Related Art

In a communication network which employs an independent synchronization type transmission system, each station connected to the network uses its autonomous clock for data transmission. Clock tolerances at stations are compensated for by adjusting a length of a preamble attached to data.

Almost every transmitter and receiver circuits connected to a communication network requires a duration of several bits from the time an input appears until a valid output is provided. For this reason, a bit string called a preamble is commonly added to a part preceding each data which constitutes a frame, whereby clock tolerance compensation is performed which permits the transmitter and receiver circuits to reach their steady states, i.e., the states in which they can send their valid outputs to a system. The length of the preamble in FDDI-II is typically 5 symbols (1 symbol=5 bits).

In such a communication network, since each station connected to the communication network uses its autonomous clock for data transmission, a cumulative phase difference of transmitted serial data, which results from subtle differences between the frequencies of the respective stations, may not be of negligible magnitude.

The process of formation of the cumulative phase difference is shown in FIGS. 15 and 16.

Referring to FIG. 15, a first station 1 to an $n^{th}$ station n are connected to the above-described communication network. It is assumed here that the first station 1, which receives serial data S0 transmitted at a transmission frequency f0, temporarily stores the serial data S0 in its buffer memory and transmits the stored data to a succeeding station, carries out the operation of reading out (transmitting) the stored data at an internal frequency f1 slightly lower than the transmission frequency f0. It is similarly assumed that a second station 2, which receives serial data S1 transmitted from the first station 1 (at the transmission frequency f1), temporarily stores the serial data S1 in its buffer memory and transmits the stored data to a succeeding station, carries out the operation of reading out (transmitting) the stored data at an internal frequency f2 slightly higher than the aforesaid frequency f1. It is similarly assumed that a third station 3, which receives serial data S2 transmitted from the second station 2 (at the transmission frequency f2), temporarily stores the serial data S2 in its buffer memory and transmits the stored data to a succeeding station, carries out the operation of reading out (transmitting) the stored data at an internal frequency f3 slightly higher than the aforesaid frequency f2. According to the above-described assumptions, the phases of the serial data S0 to S3 will exhibit variations as shown in FIGS. 16, (a) to (d), respectively. If the shown phase differences are accumulated, an overflow or an underflow will occur in the aforesaid buffer memory for the aforesaid temporary data storage in a certain succeeding station. As a result, there may be a case where even the normal operation of such a station cannot be ensured.

To cope with the above-described problems, each station has conventionally been provided with a device of the type shown in FIG. 17 so that the above-described phase differences can be absorbed by increasing or decreasing the length of the preamble (a part PA of each serial data, indicated by oblique hatching in FIG. 16).

In the device shown in FIG. 17, an internal clock source 11 serves as a part for generating a clock signal which determines the operating frequency of an associated station, and an elasticity buffer 12 and a smoothing buffer 13 each serves as a part for temporarily storing the aforesaid serial data by a FIFO (first-in/first-out) method. A clock derivator 14 derives a transmitted clock from input serial data and writes the input serial data to the elasticity buffer 12 on the basis of the derived clock WC1. A buffer capacity detector 15 detects the amount of data written to the elasticity buffer 12, that is, the amount of memory of the elasticity buffer 12 which is used each time writing is performed. A clock phase controller 16 provides control to shift (advance or delay) the phase of a clock generated by the internal clock source 11 on the basis of the detection output of the buffer capacity detector 15 and reads out the data stored in the elasticity buffer 12 on the basis of a clock RC1 having the thus-obtained controlled phase in order to absorb through the elasticity buffer 12 the phase deviation of data due to the above-described frequency differences between the stations. A preamble length detector 17 detects the length of the preamble PA contained in the serial data read from the elasticity buffer 12 (for example, detects the preamble PA and counts the length thereof). A buffer capacity detector 18 detects the amount of memory of the smoothing buffer 13 which is used for each writing operation. A clock phase controller 19 provides control to shift the phase of a clock generated by the internal clock source 11 on the basis of the detection output of each of the preamble length detector 17 and the buffer capacity detector 18 and writes the serial data read from the elasticity buffer 12 to the smoothing buffer 13 on the basis of a clock WC2 having the thus-obtained controlled phase in order to increase or decrease the length of the preamble PA through the smoothing buffer 13. The data thus written to the smoothing buffer 13 is read out on the basis of a clock RC2 generated by the internal clock source 11, and is outputted from the corresponding station as data to be transmitted to the succeeding station.

The following description refers to several typical examples of a conventional method of controlling the smoothing buffer 13 by means of the device shown in FIG. 17, particularly the clock phase controller 19, that is to say, a conventional adjustment method for a preamble length, and the control algorithms of each of the conventional examples is also set forth.

1) First Method (hereinafter referred to as a "limit smoother" for convenience' sake)

In this method, if the length of a preamble is 4 to 6 symbols, the preamble is transmitted as received, and if the length of the preamble is either 3 symbols or less or 7 symbols or more, adjustment of the length of the preamble is performed. Control algorithms are as follows.

(a) The smoothing buffer 13 is placed in 50% utilization condition at the time of resetting of a network.

(b) The smoothing buffer 13 is made to perform its FIFO operation with respect to each part of data other than a preamble part. More specifically, symbols are taken out of the smoothing buffer 13 and are transmitted until a succeeding preamble appears.

(c) In a case where the detected preamble has a length of 3 symbols or less and a starting delimiter of the succeeding cycle (the identification code attached to the leading part of the cycle) appears in an output of the buffer 13, if the utilization of the buffer 13 is less than 100%, the preamble is transmitted instead of the starting delimiter and the input from the preceding station is buffered. If the utilization of the buffer 13 reaches 100% or if the length of the transmitted preamble increases to 4 symbols, transmission of the succeeding cycle is started with the starting delimiter positioned in the leading part of the buffer 13.

(d) The number of symbols of the preamble which is being transmitted is counted. If 6 symbols are transmitted and no starting delimiter of the succeeding cycle appears in the output of the buffer 13, preambles are taken and discarded from the buffer 13 until the starting delimiter appears. If the starting delimiter has not yet been buffered, the buffer 13 becomes empty in this step. Therefore, the process awaits the arrival of the starting delimiter while retransmitting the preambles.

2) Second Method (hereinafter referred to as a "centering smoother" for convenience's sake)

In a case where the aforesaid limit smoother transmits the preamble of 4 or 6 symbols, if the utilization of the buffer 13 can be made to approach 50% by making the length of the preamble 5 symbols, the preamble of 5 symbols is transmitted instead of the preamble of 4 or 6 symbols in the following way.

(a) The smoothing buffer 13 is placed in 50% utilization condition at the time of resetting of a network.

(b) The smoothing buffer 13 is made to perform its FIFO operation with respect to each part of data other than a preamble part. More specifically, symbols are taken out of the smoothing buffer 13 and are transmitted until a succeeding preamble appears.

(c) In a case where the length of a preamble to be transmitted is 3 symbols or less and the starting delimiter of the succeeding cycle appears in the output of the buffer 13 and where the utilization of the buffer 13 is less than 100%, the preamble is transmitted instead of the starting delimiter and the input from the preceding station is buffered.

c-1) When the utilization of the buffer 13 reaches 100%; or c-2) when the utilization of the buffer 13 exceeds 50% and the length of the transmitted preamble increases to 4 symbols; or c-3) when the utilization of the buffer 13 is 50% or less and the length of the transmitted preamble increases to 5 symbols, transmission of the succeeding cycle is started with the starting delimiter positioned in the leading part of the buffer 13.

(d) The number of symbols of the preamble which is being transmitted is counted.

d-1) A preamble of 5 symbols is transmitted, and if and as long as the utilization of the buffer 13 exceeds 50%, preambles remaining in the buffer 13 are read out and discarded until the starting delimiter appears in the output of the buffer 13. If the utilization of the buffer 13 decreases to 50% (or less) during discarding of the preambles, the process proceeds to the next d-2).

d-2) The preambles are taken out and transmitted from the buffer 13. If the length of the preamble amounts to 6 symbols, as long as the buffer 13 is not empty, the preambles are read out and discarded from the buffer 13 until the starting delimiter appears. If no starting delimiter has yet been buffered, the buffer 13 becomes empty in this step. Therefore, the process awaits the arrival of the starting delimiter while transmitting the preambles.

3) Third Method (hereinafter referred to as a "target smoother" for convenience's sake)

In this method, the length of a preamble is made to approach 5 symbols as long as the capacity of the buffer 13 permits. Control algorithms are as follows.

(a) The smoothing buffer 13 is placed in 50% utilization condition at the time of resetting of a network.

(b) The smoothing buffer 13 is made to perform its FIFO operation with respect to each part of data other than a preamble part. More specifically, symbols are taken out of the smoothing buffer 13 and are transmitted until a succeeding preamble appears.

(c) In a case where the length of a preamble to be transmitted is 4 symbols or less and a starting delimiter of a succeeding cycle appears at the output of the buffer 13 and where the utilization of the buffer 13 is less than 100%, the preamble is transmitted instead of the starting delimiter and the input from the preceding station is buffered. If the utilization of the buffer 13 reaches 100%, transmission of the succeeding cycle is started with the starting delimiter positioned in the leading part of the buffer 13.

(d) The number of symbols of a preamble which is being transmitted is counted. After a preamble of 5 symbols has been transmitted, as long as the buffer 13 is not empty, preambles are read and discarded from the buffer 13 until the starting delimiter appears. If the starting delimiter has not yet been buffered, the buffer 13 becomes empty in this step. Therefore, the process awaits the arrival of the starting delimiter while transmitting the preambles.

The above-described examples are conventional representative preamble length adjustment methods. As for documents relating to the above-described preamble length adjustment methods, the following reports are known which are contained in ANSI (American National Standards Institute) working paper:

(A) DRAFT PROPOSED ANS "FDDI HYBRID RING CONTROL" (Aug. 12, 1988) P.32 to P.38;

(B) David Dodds "JITTER CONTROL IN FDDI-II SYSTEMS" (Sep. 30, 1987); and (C) David Dodds "JITTER CONTROL IN FDDI-II SYSTEMS Progress Report" (Jul. 8, 1987).

As is apparent from FIG. 17, in any of the above-described conventional preamble length adjustment methods, the phase deviation of data due to the frequency differences between stations is absorbed through an elasticity buffer, and a preamble length, which has been adjusted to be extremely short or long by the absorption of the phase deviation, is corrected through a smoothing buffer. Accordingly, in such a method, if successive cycles (frames) of short preambles arrive at a certain station, the smoothing buffer operates to successively restore the preamble lengths and may use up its allowable buffer capacity in several cycles. In such a case, it follows that the subsequent cycles of serial data are sent to a succeeding station without any correction. As a result, if transmitted serial data are passed through a multiplicity of stations and the aforesaid adjustment is repeated for the same cycle, the preamble length of such a cycle is progressively reduced and a length of 0 symbols (the absence of a preamble) might result. This result means that the subsequent adjustment is applied to a data portion and data destruction might be caused.

SUMMARY OF THE INVENTION

It is, therefore, an object of the present invention to provide a preamble length adjustment method in a communication network which can maintain the length of a preamble within a range of suitable lengths to ensure a stable system operation for the network even in an environment in which a number of unfavorable conditions exist, as well as an independent synchronization type serial data communication device which aids the independently synchronous operation of each connected station with high reliability by adopting such a preamble length adjustment method.

To achieve the above object, in accordance with one aspect of the present invention, there is provided a method of adjusting and absorbing a cumulative phase difference of serial data by increasing or decreasing a length of a preamble added to each frame of the serial data. In the method, a preamble length adjustment algorithm (an algorithm for executing control to increase or decrease a preamble length) is arranged to inhibit the length of the preamble relative to the same frame from being repeatedly increased or decreased in the same increasing or decreasing direction if the length of the preamble relative to the frame has already been increased or decreased.

More specifically, as previously described, the length of a preamble is increased or decreased by means of a buffer of a first-in/first-out type. If $\pm m$ indicates an allowable capacity of the buffer (m is an integer), $PAi$ the length of a preamble inputted to the buffer, $PA$ the length of a preamble outputted from the buffer, n a reference value of the length of the preamble (n is an integer), and B the amount of buffer memory used;

(a) when $-m \leq B \leq +m$
$PA = PAi;$ (b) when $B < -m$
if $PAi \leq n$
$PA = PAi + 1$
if $PAi = n + 1$
$PA = PAi$ (not adjusted); and (c) when $B > +m$
if $PAi \geq n$
$PA = PAi - 1$
if $PAi = n - 1$
$PA = PAi$ (not adjusted)

whereby adjustment of the length of the preamble (control to increase or decrease the length of the preamble) is performed.

In accordance with another aspect of the present invention, there is provided an independent synchronization type serial data communication device having a preamble length adjustment function of the above-described type. The device comprises (A) an internal clock source for generating a clock signal of a predetermined frequency for transmission of serial data, (B) buffer means for temporarily storing the serial data by a first-in/first-out method, (C) clock deriving means for deriving the transmitted clock from the input serial data and writing the serial data to the buffer means on the basis of the derived clock, (D) first detecting means for detecting the amount of data stored in the buffer means, (E) second detecting means for detecting a length of a preamble contained in the input serial data, and (F) clock phase controlling means operative on the basis of detection outputs of the first and second detecting means for executing control to delay the phase of a clock generated by the internal clock source in a first case where the detection output of the first detecting means is less than a predetermined amount and where the detection output of the second detecting means is less than a reference value, for executing control to advance the phase of the clock generated by the internal clock source in a second case where the detection output of the first detecting means is greater than the predetermined amount and where the detection output of the second detecting means is greater than the reference value, and for executing control to maintain the phase of the clock generated by the internal clock source at a reference phase for serial data transmission in a case other than the first and second cases, the clock phase controlling means reading out the data stored in the buffer means as serial data to be outputted to a succeeding station on the basis of the clock having a controlled phase obtained by any one of the aforesaid controls.

The advantages of such an independent synchronization type serial data communication device will be described below.

According to the above-described conventional preamble length adjustment algorithm, even if there is a frame (cycle) in which a length of a preamble has already been adjusted by a preceding station in the direction in which it is increased or decreased, if it is determined on the basis of decision conditions of an active station that the length of the preamble of such a frame should be increased or decreased, the length of the preamble is adjusted in the direction in which it is further increased or decreased. However, in the above-described preamble length adjustment algorithm according to the present invention, the length of each preamble which is inputted to a buffer (corresponding to what has conventionally been called an elasticity buffer) is monitored, and if it is determined that the preamble length of a frame has already been adjusted in the same increasing or decreasing direction, adjustment of the preamble length of the frame is inhibited and such adjustment is carried forward to a succeeding frame (cycle). If it is determined that the preamble length of the succeeding frame has also already been adjusted in the same increasing or decreasing direction, the adjustment of the preamble length of the frame is further carried forward to a following frame. As is apparent from the foregoing description, according to the present embodiment, repetition of preamble length adjustment with respect to the same frame is prevented, so that resistance to data destruction can be remarkably improved.

In the aforesaid independent synchronization type serial data communication device, the clock phase controlling means (F) executes the aforesaid preamble length adjustment algorithms (a) to (c) by means of the buffer means (B) (corresponding to what has conventionally been called an elasticity buffer). The independent synchronization type serial data communication device is disposed in each station connected to the network, so that it is possible to implement stable data transmission free from data destruction or the like.

In the phase control provided by the clock phase controlling means (F), the control to advance the phase of the aforesaid clock corresponds to a "decrease" in preamble length, while the control to delay the phase of the aforesaid clock corresponds to an "increase" in preamble length.

As is apparent from the foregoing description, according to the present invention, the length of each preamble contained in an input frame is monitored, and if it is determined that there is a frame in which the length of a preamble has already been adjusted in the same increasing or decreasing direction, adjustment of the preamble length of the frame is inhibited and such adjustment is carried forward to a succeeding frame. If it is determined that the preamble length of the succeeding frame has also already been adjusted in the same increasing or decreasing direction, the adjustment of the preamble length of the frame is further carried forward to a following frame. Accordingly, repetition of preamble length adjustment with respect to the same frame is prevented, and it is possible to maintain the aforesaid preamble length within a range of suitable lengths in any case. In consequence, it is possible to implement highly stable data transmission which is free from the overflow or underflow of a buffer memory, data destruction or the like.

In addition, according to the present invention, it is possible to implement the above-described excellent functions by means of a simple and small-scale construction.

BRIEF DESCRIPTION OF THE DRAWINGS

FIG. 1 is a schematic block diagram showing one embodiment of an independent synchronization type serial data communication device according to the present invention;

FIG. 2 is a table showing the manner of the adjustment of a preamble length carried out by the device shown in FIG. 1;

FIG. 10 is a schematic block diagram which defines station frequency differences $\Delta f$ between a plurality of stations in a model to be considered in the present specification;

FIG. 11 is a time chart diagrammatically showing the manner of accumulation of frequency deviations in a case where preamble disappearance may occur, particularly when it is assumed that all the station frequency differences $\Delta f$ are equal to one another;

FIGS. 12(a) and 12(b) are time charts diagrammatically showing the manner of accumulation of frequency deviations in a case where preamble disappearance may occur more easily than the case of FIG. 11, i.e., when it is assumed that the station frequency returns to its initial state;

FIG. 13 is a time chart showing the relationship between the maximum number of delays, N, in preamble length adjustment and a preamble adjustment period T in the case shown in FIGS. 12(a) and 12(b);

FIG. 14 is a table showing the results of simulations relative to the preamble length adjustment executed by the device shown in FIG. 1;

DESCRIPTION OF THE PREFERRED EMBODIMENT

FIG. 1 is a schematic block diagram showing one embodiment of an independent synchronization type serial data communication device according to the present invention.

Figure 15:
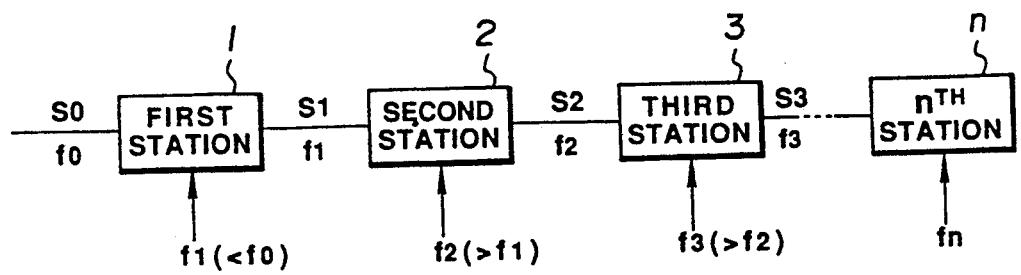
FIG. 15 is a schematic block diagram showing a situation in which the station frequencies of individual stations do not completely coincide with one another in a network in which each of the stations operates independently synchronously.
Figure 17:
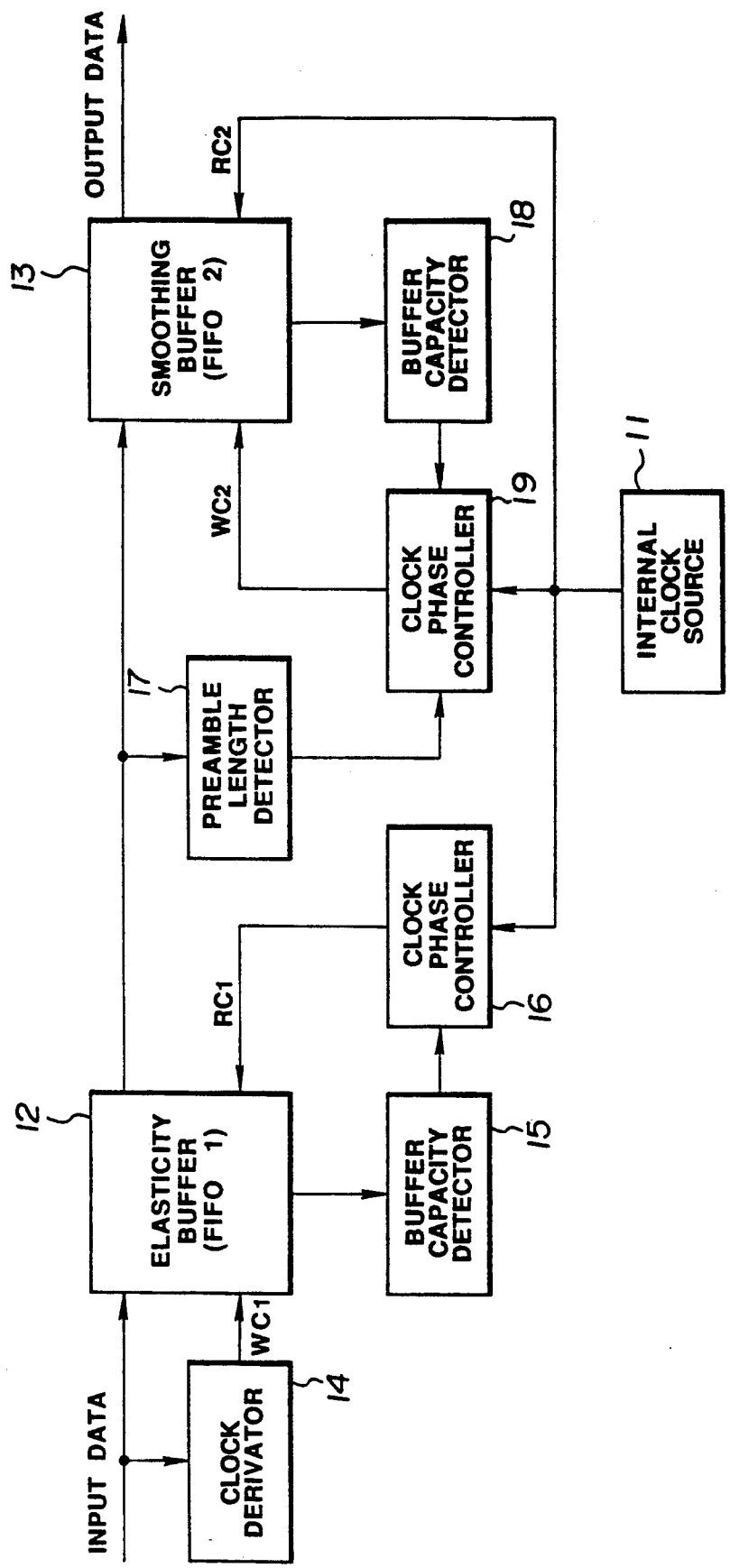
FIG. 17 is a schematic block diagram showing an example of the construction of a conventional independent synchronization type serial data communication device.

Similarly to the device shown in FIG. 17, the shown device is provided in each station connected to a communication network (refer to FIG. 15).

The construction of the device and the function of each part thereof will initially be explained.

In the device shown in FIG. 1, an internal clock source 21 generates a clock signal which determines the operating frequency of an associated station. In each of the stations, the clock frequency is basically set at the same frequency, but in practice, the accuracy of the setting varies due to factors such as various differences between parts which constitute the clock source 21. As a result, as described previously, a small frequency difference occurs between each station. However, modern techniques make it possible to suppress such a frequency deviation to a maximum of approximately ±50 ppm.

A buffer 22 corresponds to the elasticity buffer 12 of the conventional device (FIG. 17), and also has the function of the smoothing buffer 13 in the conventional device. Similarly to the buffers 12 and 13, the buffer 22 temporarily stores serial data inputted to the associated station in a FIFO manner. In the shown example, the buffer capacity of the buffer 22 is selected to be ±5 bits (2 symbols).

A clock derivator 23 drives a transmitted clock from the serial data inputted to the associated station, and writes the serial data to the buffer 22 on the basis of a derived clock WC. The circuit construction of the clock derivator 23 is well known.

A buffer capacity detector 24 detects the amount of data written to the buffer 22, that is, the amount of memory of the buffer 22 which is used each time writing is performed. Detection of such a buffer amount is implemented, for example, by detecting the phase difference between the derived clock WC which serves as a buffer write clock and a buffer read clock RC which will be described later.

Figure 16:
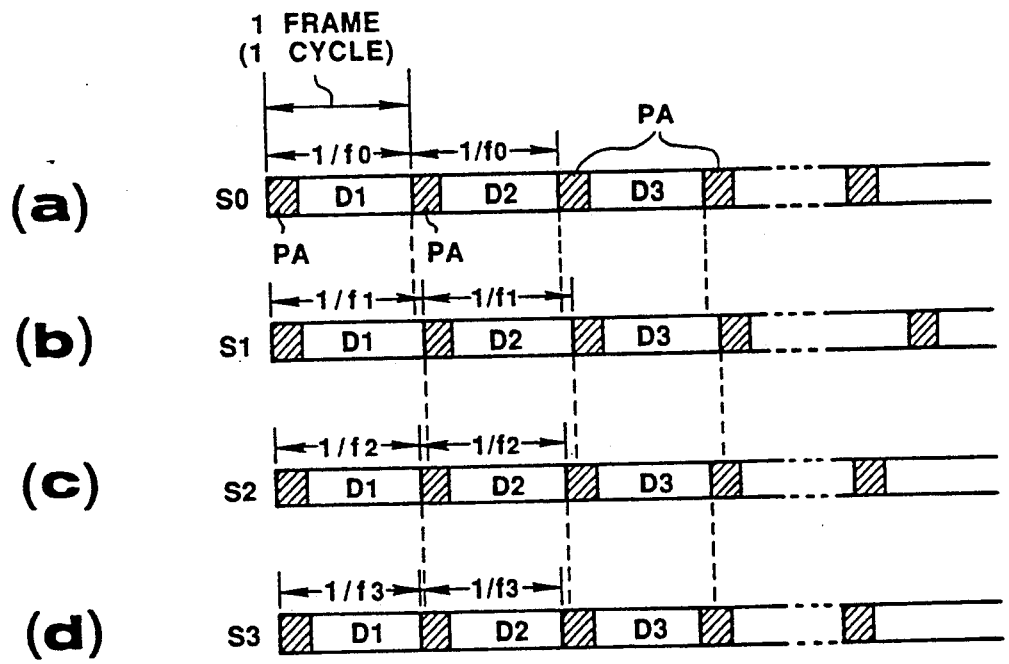
FIG. 16 is a timing chart showing a phenomenon in which serial data transmitted between each station undergoes a phase deviation due to the aforesaid non-coincident station frequencies.

A preamble length detector 25 detects the length of a preamble PA (refer to the parts indicated by oblique hatching in FIG. 16) from the serial data inputted to the associated station. Detection of such a preamble length is implemented, for example, by detecting the starting point of the preamble PA of the serial data and counting the number of constituent symbols (the number of bits) by means of a counter.

A clock phase controller 26 executes control to advance, delay or maintain the phase of a clock generated by the internal clock source 21 in accordance with a predetermined preamble length adjustment algorithm on the basis of the detection output of each of the preamble length detector 25 and the buffer capacity detector 24, and writes the data stored in the buffer 22 on the basis of a clock having the thus-obtained controlled phase (which serves as a read clock RC for the buffer 22). The read data is outputted from the associated station as serial data to be transmitted to the succeeding station.

A detailed description will be made below in connection with a preamble length adjustment algorithm which constitutes the core of control executed in the clock phase controller 26.

The present embodiment premisses that: (1) the reference value of the length of the preamble PA which length is set in the network concerned is 5 symbols as described above (the preamble as well as the length thereof is hereinafter referred to as a "PA" for convenience's sake); (2) the preamble length PA is adjusted within the range $4 \leq PA \leq 6$; and (3) the buffer 22 is a buffer having a buffer capacity of ±5 bits as described previously, and from the range of ±5 bits, ±3 bits are selected as thresholds to carry out preamble length adjustment. In this case, "0" in the buffer 22 is the buffer center and a deviation from the buffer center in the "+" direction is regarded as an output phase delay.

On the above-described premisses, if PAi (symbol) represents the length of a preamble inputted to the buffer 22, i.e., the preamble length detected by the preamble length detector 25; PA (symbol) represents the preamble length to which the device adjusts the preamble length PAi, i.e., the length of a preamble actually outputted from the buffer 22; and B (bit) represents the amount of memory of the buffer 22 which is used each time writing is performed, i.e., the amount of buffer memory used which is detected by the buffer capacity detector 24, the clock phase controller 26 executes the above-described clock phase control so as to implement the following preamble length adjustment:

When $-3 \leq B \leq +3$     (a)

$PA = PAi$

When $B < -3$     (b)

if     $PAi \leq 5$ $PA = PAi + 1$ if     $PAi = 6$ $PA = PAi$ (passed to the succeeding cycle without adjustment)

When $B > +3$     (c)

if     $PAi \geq 5$ $PA = PAi - 1$ if     $PAi = 4$ $PA = PAi$ (passed to the succeeding cycle without adjustment)

In other words, in such preamble length adjustment, a "decrease" in the input preamble length PAi corresponds to control to advance the phase of the aforesaid read clock RC, while an "increase" in the input preamble length PAi corresponds to control to delay the phase of the read clock RC (so-called delayed state). The "maintenance" of the input preamble length PAi corresponds to control to maintain the phase of the operating clock of the associated station which is generated from the internal clock source 21 and read out the temporarily stored data (preamble) of the buffer 22 on the basis of a clock (clock RC) having the maintained phase. Accordingly, if the detection output B of the buffer capacity detector 24 is smaller than the aforesaid threshold ($B < -3$) and the detection output PAi of the preamble length detector 25 is not greater than the reference value ($PAi \leq 5$), the clock phase controller 26 delays the phase of the clock generated by the internal clock source 21 by an amount in which the preamble is increased by 1 symbol ($PA = PAi + 1$). If the detection output B of the buffer capacity detector 24 is greater than the aforesaid threshold ($B > +3$) and the detection output PAi of the preamble length detector 25 is not smaller than the reference value ($PAi \geq 5$), the clock phase controller 26 advances the phase of the clock generated by the internal clock source 21 by an amount in which the preamble is decreased by 1 symbol ($PA = PAi - 1$). Otherwise, control to maintain the phase of the clock generated by the internal clock source 21 at the reference phase of the associated station is carried out.

FIG. 2 is a table showing in summary the relationship between an increase and a decrease in the number of preamble symbols which are determined by the amount of buffer memory used, B, and the value of the input preamble length PAi.

The operation of the device of the present embodiment is as follows.

(1) If the amount of buffer memory, B, which is detected through the buffer capacity detector 24 after a preamble associated with a certain one frame has been detected from serial data inputted to the associated station, is within the range of the thresholds:

$-3 \leq B \leq +3$ as in the case of the aforesaid algorithm (a), the clock generated by the internal clock source 21 is applied to the buffer 22 as the read clock RC without modification. Accordingly, in this case, the preamble length PAi of the frame is not altered and is transmitted to the succeeding station without modification in the form:

PA=PAi (2) Similarly, if the amount of buffer memory, B, which is detected through the buffer capacity detector 24, is below a lower-limit threshold, that is, if:

B<−3 as in the case of the aforesaid algorithm (b), reference is further made to the preamble length PAi which is detected through the preamble length detector 25. If the value PAi has not yet been adjusted in the direction in which it is increased, that is, if:

PAi≦5 then the input preamble length PAi is increased by 1 symbol through the above-described phase control provided by the clock phase controller 26 and the preamble PA is transmitted to the succeeding station in the form:

PA=PAi+1(=5 or 6)

If it is determined that the aforesaid referenced preamble length PAi has already been adjusted in the direction in which it is increased, that is, if:

PAi=6 the aforesaid increase is not performed and the preamble PA is transmitted to the succeeding station without modification in the form:

PA=PAi(=6)(Refer to Part *1 in FIG. 2.)

(3) Similarly, if the amount of buffer memory, B, which is detected through the buffer capacity detector 24, is above an upper-limit threshold, that is, if:

B>+3 as in the case of the aforesaid algorithm (c), reference is further made to the preamble length PAi which is detected through the preamble length detector 25. If the value PAi has not yet been adjusted in the direction in which it is decreased, that is, if:

PAi≧5 then the input preamble length PAi is decreased by 1 symbol through the above-described phase control provided by the clock phase controller 26 and the preamble PA is transmitted to the succeeding station in the form:

PA=PAi−1(=5 or 4)

If it is determined that the aforesaid referenced preamble length PAi has already been adjusted in the direction in which it is decreased, that is, if:

PAi=4 the aforesaid increase is not performed and the preamble PA is transmitted to the succeeding station without modification in the form:

PA=PAi(=4)(Refer to Part *2 in FIG. 2.)

The above-described processing is repeated for each frame of input serial data.

Figure 3:
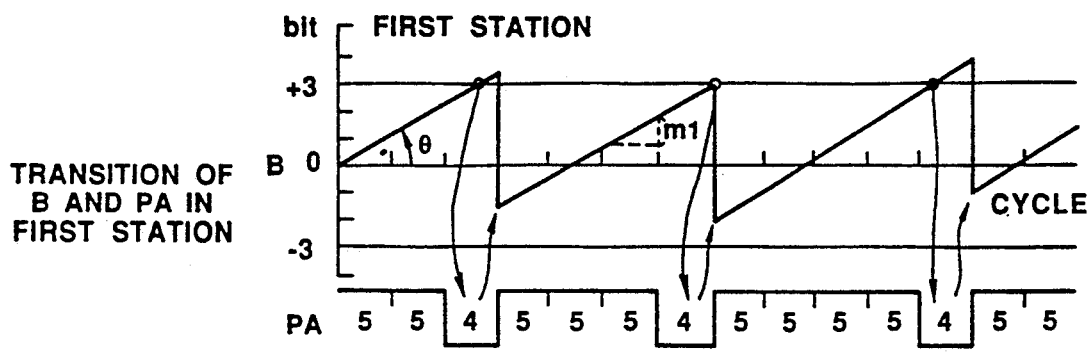
FIGS. 3(a), 3(b) and 3(c) are timing charts respectively showing examples of the preamble adjustment operations performed by three successive stations each of which is connected to a network and to which the device shown in FIG. 1 is applied.
Figure 3:
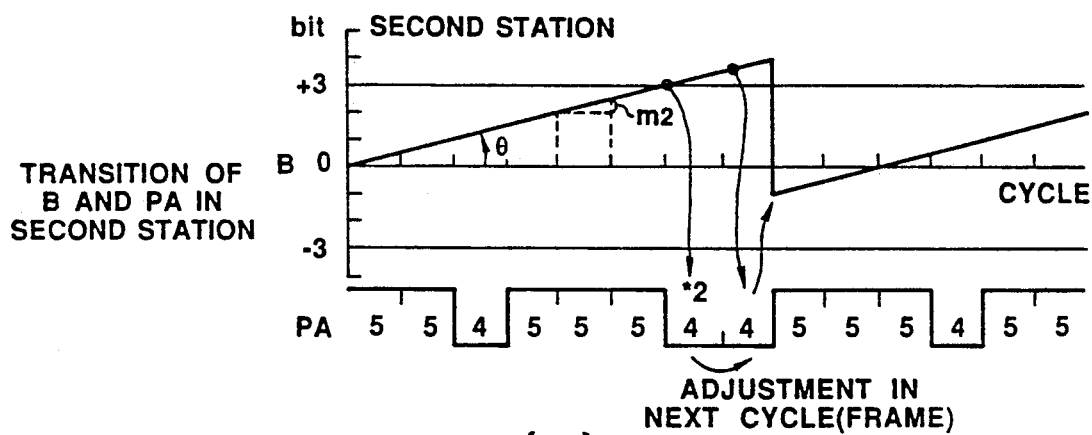
Figure 3:
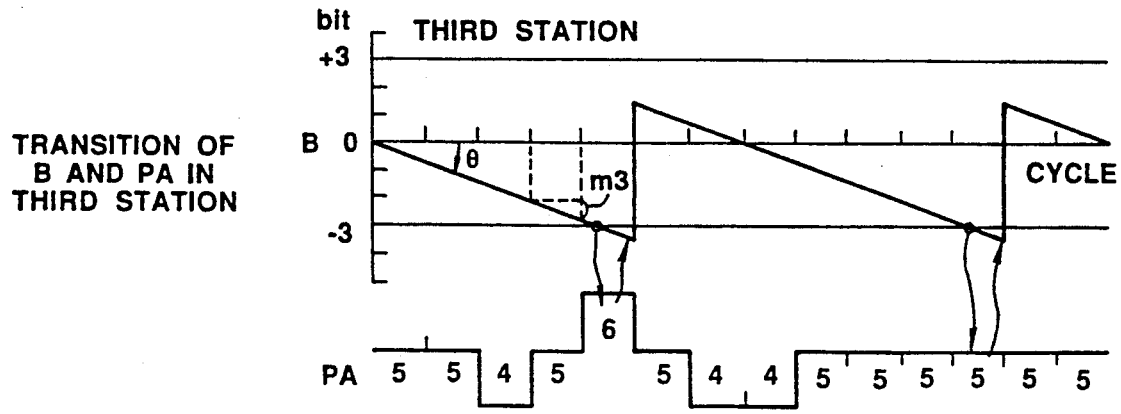

FIGS. 3(a), 3(b) and 3(c) are charts each of which shows the transition of the preamble length PA in contrast with a variation in the amount of buffer memory, B, in each step of the transition. Throughout FIGS. 3(a), 3(b) and 3(c), it is assumed that the preamble length PA is adjusted by the above-described operation executed in each of three successive stations each having the device of the aforesaid embodiment.

As shown, the preamble length PA adjusted by the first station on the basis of the aforesaid algorithms (refer to FIG. 3(a)) is passed to the second station as the input preamble length PAi in each cycle (frame), and is subjected to a further adjustment based on the aforesaid algorithms in the second station. If the amount of buffer memory, B, exceeds the upper-limit threshold (+3 bits) as indicated by a "*2" mark in FIG. 3(b) (corresponding to the "*2" mark in FIG. 2), the preamble length PA will have been subjected to an adjustment of "4 symbols"→"3 symbols" in a conventional arrangement. However, in the present embodiment, no further adjustment for decreasing the preamble length of the cycle (frame) is carried out in accordance with the above decision (3) to the effect that the preamble length has already been adjusted in the direction in which it is decreased. Such a preamble length decreasing adjustment is carried forward to a next cycle (frame) in which the amount of buffer memory, B, exceeds the upper-limit threshold (+3 bits) and in which the condition that the input preamble length PAi has not yet been adjusted in the direction in which it is decreased is satisfied. Accordingly, the possibility that the preamble length is excessively decreased (for example, to 3 symbols or less) or increased (for example, to 7 symbols or more), is extremely reduced. Of course, as far as the preamble length is not excessively decreased, the aforementioned data destruction or the like will not occur.

Throughout FIGS. 3(a), 3(b) and 3(c), a phase angle θ of a line which represents the transition of the amount of buffer memory, B, corresponds to the frequency difference between each station and the preceding station (the frequency difference between clocks generated by their respective internal clock sources). As the angle θ becomes smaller, the frequency difference between each station becomes smaller, while as the angle θ becomes greater, the frequency difference between each station becomes greater. FIG. 3(c), in which the angle θ is shown as incrementing in the negative direction, indicates that the frequency of the third station is higher than that of the second station. Each symbol m1, m2 and m3, which is attached to the line which represents the transition of the amount of buffer memory, indicates the amount of buffer consumption per cycle for the frequency difference between each station.

As is apparent from the foregoing description, according to the present embodiment, repetition of preamble length adjustment with respect to the same frame is prevented, so that resistance to data destruction can be remarkably improved.

Figure 4:
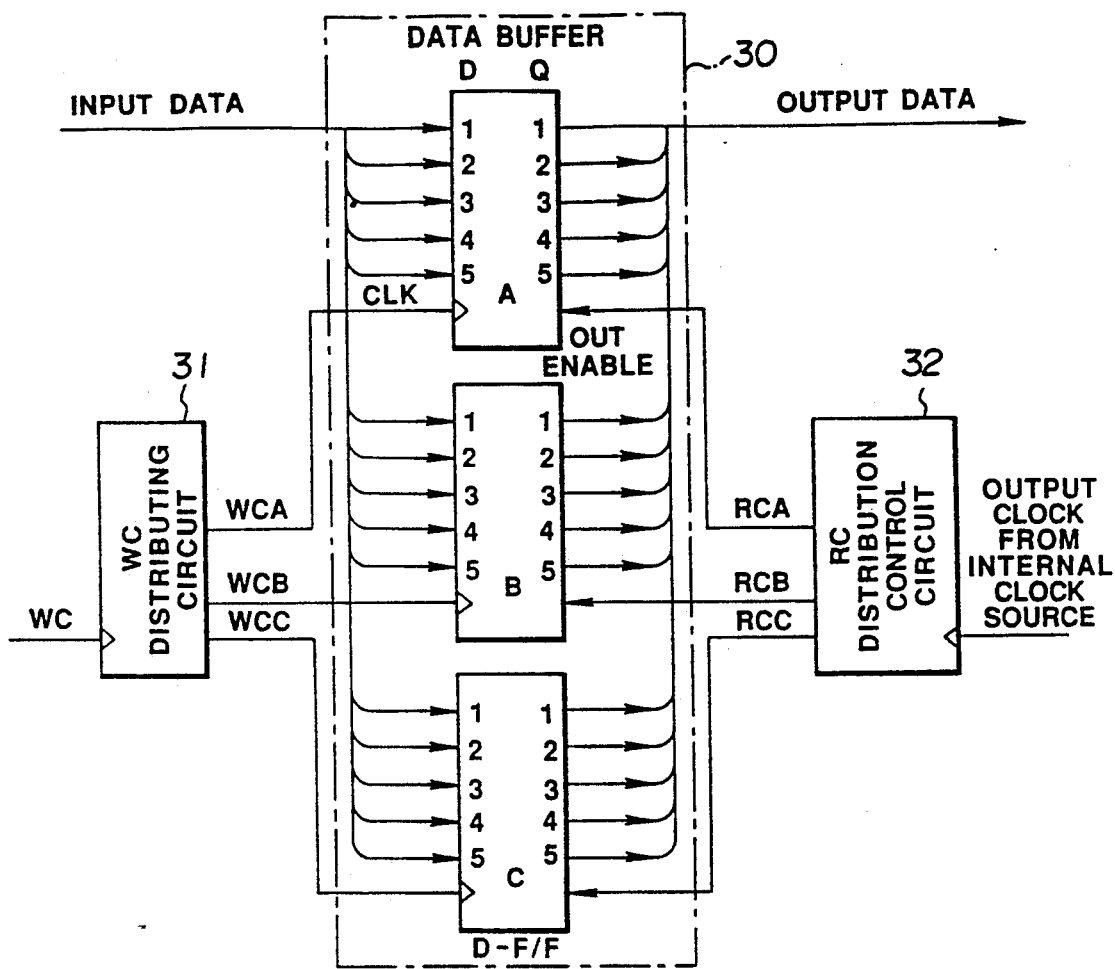
FIG. 4 is a partial block diagram showing a specific example of the construction of the buffer and the clock phase controller which are shown in FIG. 1.

FIG. 4 illustratively shows a circuit arrangement for implementing preamble length adjustment based on the aforesaid algorithms, and some elements of the circuit arrangement form part of the buffer 22 and the other element form part of the clock phase controller 26.

Figure 5:
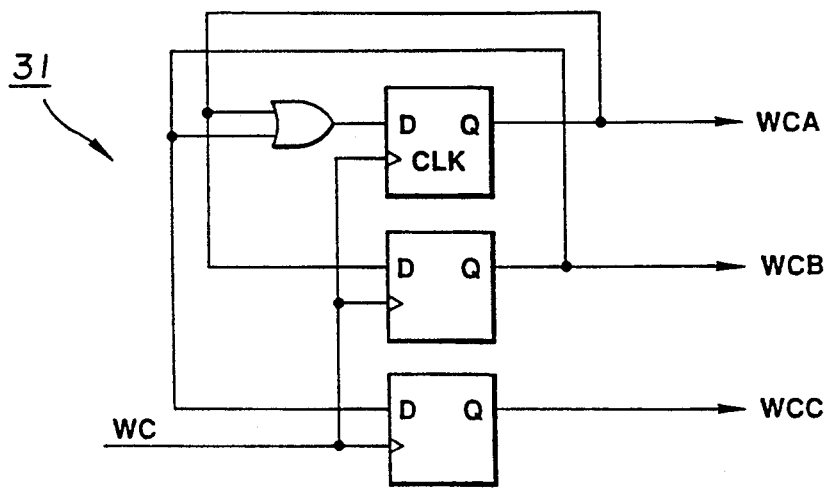
FIG. 5 is a block diagram showing an example of the construction of the WC (write clock) distributing circuit shown in FIG. 4.

In FIG. 4, a data buffer section 30 consists of three D-F/Fs (D-type flip-flops) A, B and C, and a WC (write clock) distributing circuit 31 distributes clocks among the three D-F/Fs of the data buffer section 30 on the basis of the write clock WC derived by the clock derivator 23. In the shown example, the data buffer section 30 and the WC distributing circuit 31 constitute the buffer 22, and an example of the construction of the WC distributing circuit 31 is shown in FIG. 5.

In FIG. 4, an RC (read clock) distribution control circuit 32 forms part of the clock phase controller 26. The RC distribution control circuit 32 forms and outputs an output enable (OUT Enable) signal to be applied to each of the three D-F/Fs which constitute the data buffer section 30, on the basis of the above-described algorithms prepared in the clock phase controller 26. Details of the RC distribution control circuit 32 are shown in FIG. 6 by way of example.

Figures 6, 7:
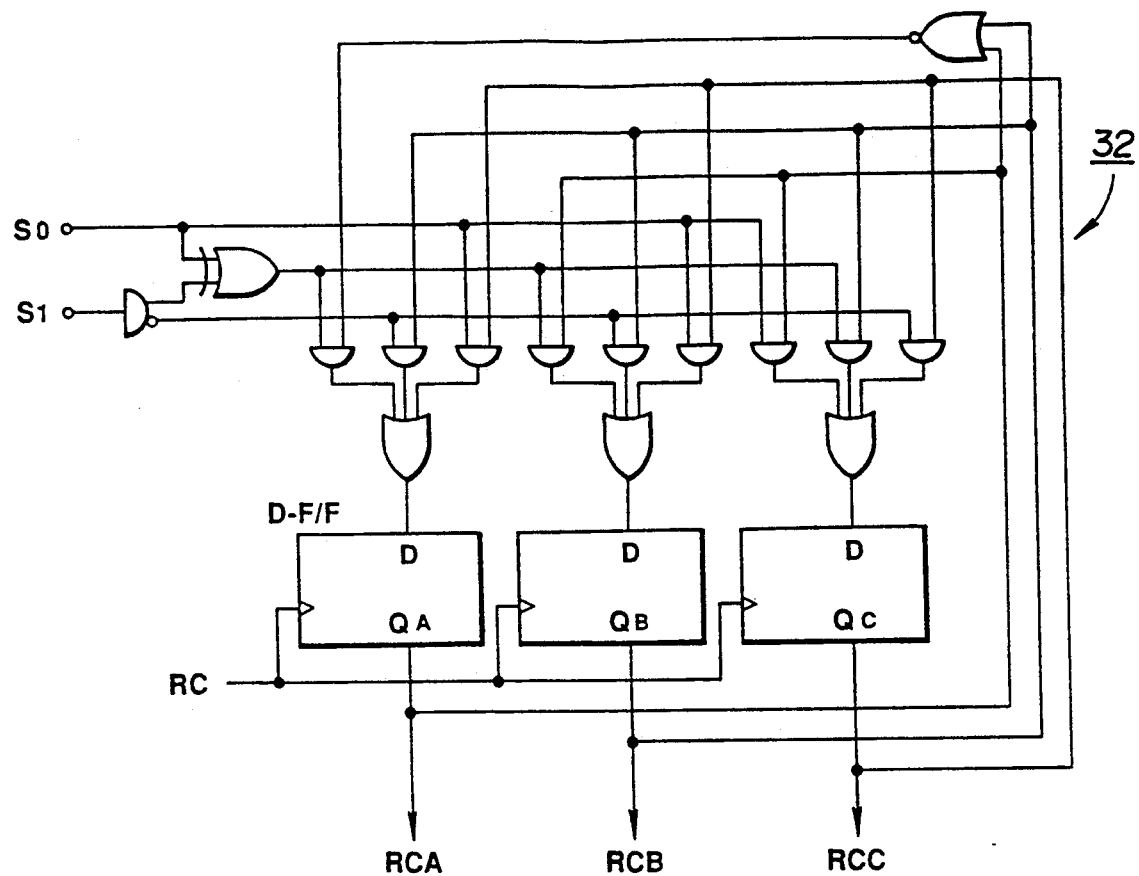
FIG. 6 is a block diagram showing an example of the construction of the RC (read clock) distribution control circuit shown in FIG. 4.
FIG. 7 is a table showing the operating characteristics of the RC distribution control circuit.

The RC distribution control circuit 32 shown in FIG. 6 implements the required functions by using shift registers each having a control mode switching function based on signals S0 and S1 and D-F/Fs (D-type flip-flops) for latching the outputs of the respective registers on the basis of the read clock RC. The relationship between the setting of each control mode and the contents of the signal outputted from each D-F/F is shown in FIG. 7.

Figure 8:
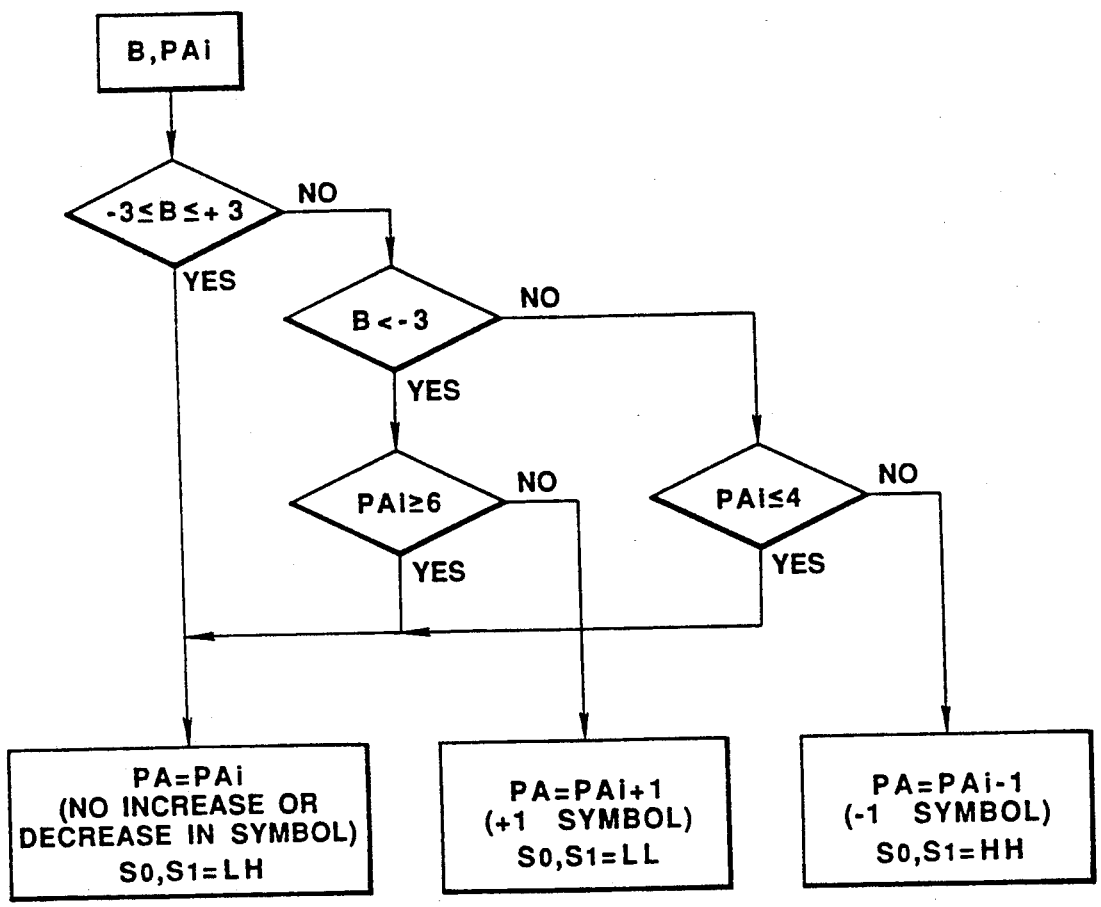
FIG. 8 is a flowchart showing the manner of setting of the operating mode of the RC distribution control circuit (shift registers)

The logic contents of the mode setting signals S0 and S1 shown in the table of FIG. 7, i.e., "L(low), H(high)", "H(high), H(high)" and "L(low), L(low)", are set on the basis of the algorithms shown in FIG. 8 in accordance with the amount of buffer used, B, applied to the clock phase controller 26 (detected by the buffer capacity detector 24) and the preamble length PAi of the input data (detected by the preamble length detector 25). The algorithms shown in FIG. 8 are identical with the above-described preamble length adjustment algorithms of the clock phase controller 26. A device which sets the logic contents of the respective mode setting signals S0 and S1 in accordance with such algorithms can be implemented in an arbitrary form, whether in software form or in hardware form.

Figures 9A, 9B, 9C:
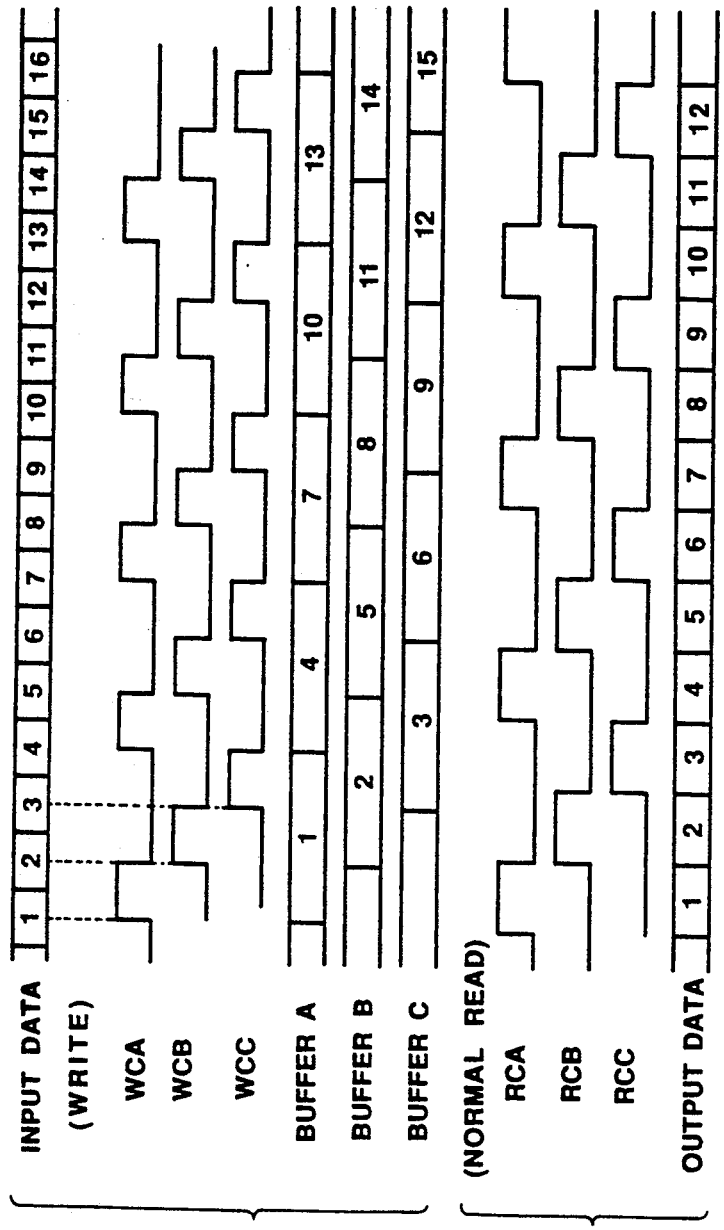
FIGS. 9(a), 9(b) and 9(c) are timing charts respectively showing examples of the operations of the circuits shown in FIGS. 4 to 6.

FIGS. 9(a), 9(b) and 9(c) collectively show examples of the operations of the respective circuits shown in FIGS. 4 to 6.

If writing of input data to the data buffer section 30 is performed through the WC distribution circuit 31 in the manner shown in, for example, FIG. 9(a), the written contents are outputted from the data buffer section 30 (the buffer 22) in as-written form in the manner shown in FIG. 9(b) through the shift operation of FIG. 7 executed by the RC distribution control circuit 32, during a normal reading operation, i.e., a reading operation executed when the number of symbols is adjusted to "0 (PA=PAi)" in the table of FIG. 2. However, if a condition for adjusting the number of symbols to "−1 (PA=-PAi−1)" in the table of FIG. 2 is satisfied or if a condition for adjusting the number of symbols to "+1 (PA=-PAi+1)" in the same table is satisfied, reverse shift control (phase is advanced) or delay control (phase is delayed) is executed as shown in, for example, FIG. 9(c) through the shift operation of FIG. 7 executed by the RC distribution control circuit 32 (the clock phase control circuit 26). Thus, the preamble length of the data outputted from the data buffer section 30 (the buffer 22) is also appropriately adjusted in the manner shown in FIG. 9(c).

The following is a consideration as to the possibility of preamble disappearance in the above-described preamble length adjustment method.

Consideration 1

A simple model which is susceptible to preamble disappearance will be discussed with reference to a case where a frequency difference $\Delta f$ between every station is equal as shown in FIG. 10.

In such a case, if the allowable deviation in station frequency between every station is $\pm \Delta F$ ppm, a frequency difference of a maximum of $2\Delta F$ occurs between a station frequency F1 of a first station 1 and a station frequency Fn of an $n^{th}$ station n, as shown in FIG. 11. In addition, since the frequency difference $\Delta f$ between every station is equal, the buffer overflow period of every station coincides, and in the worst case, the maximum number of delays in the aforesaid preamble length adjustment (for example, the number of times by which a delay such as that indicated by, for example, the "*2" mark in FIG. 3(b) is continuously executed) may be (n−1) cycles:

$$N = n - 1 = 2\Delta F/\Delta f \qquad (1)$$

where N is the maximum number of delays.

Since one cycle is normally set to 15,625 bits, the amount of buffer consumption per cycle, m, (refer to the m1, m2 and m3 shown in FIG. 3) based on the frequency difference $\Delta f$ becomes:

$$m = 1.5625 \times 0.01 \times \Delta f \text{[bit/cycle]}$$

Further, if the adjustment unit of preamble length is set to 1 symbol (=5 bits) as described above, the adjustment period of preamble length, T, becomes:

$$\begin{aligned} T &= 5/m \\ &= 5/(1.5625 \times 0.01 \times \Delta f) \end{aligned} \qquad (2)$$

Therefore, from Equations (1) and (2), the ratio of the maximum number of delays (the number of continuous delays), N, in the preamble length adjustment to the adjustment period T becomes:

$$\begin{aligned} N/T &= \Delta F/160 \\ &= 0.625 \text{ (where } \Delta F = 100 \text{ ppm)} \end{aligned} \qquad (3)$$

Here, a requirement which prevents the preamble length PA from decreasing to 4 symbols or less is that the number of cycles (frames) within the adjustment period T has a margin for the maximum number of delays, N, in the above-described adjustment. More specifically, the aforesaid ratio N/T represents such a margin, and in general, if the margin is:

$$N/T < 1 \qquad (4)$$

the requirement which prevents the preamble length PA from decreasing to 4 symbols or less is satisfied. It is to be noted that the aforesaid equation (3) means that if $\Delta F < \pm 160$ ppm, the preamble length PA is necessarily set to 4, 5 or 6 symbols and no preamble disappearance takes place.

According to Equation (4), it appears that as the number of adjustment delays, N, increases, the margin for maintaining the preamble length within the range of 4 to 6 symbols becomes smaller. In this case, however, a requirement which permits the number of adjustment delays, N, to increase is that the frequency difference $\Delta f$ between each station becomes small, and if the frequency difference $\Delta f$ between each station becomes small, the aforesaid adjustment period T becomes long correspondingly (refer to Equation (2)). In other words, even if the number of adjustment delays, N, increases, the value of the number N which is allowed by a requirement which satisfies Equation (4) increases as well. It is expected, therefore, that as far as preamble length adjustment is made according to the aforesaid algorithms, the relationship of Equation (4) is not impaired.

In such a preamble length adjustment method, the number of bits of the buffer, which is required to delay adjustment of the preamble length PA until the succeeding cycle when the adjustment operation of the preamble length PA continues for n cycles, may be selected to become the number of bits corresponding to the allowable deviation of a maximum of $2\Delta F$. In other words, if:

$$\Delta f < \pm 100 \text{ ppm}$$

the number of bits, b, becomes:

$$b = 1.5625 \times 2\Delta F \times 0.01 = 4[\text{bit}]$$

In the aforesaid example, the minimum number of threshold bits is $\pm 3$ bits when adjustment for 1 symbol ($=5$ bits) is performed, and by adding the number of bits, b, to the minimum number of threshold bits, the minimum number of bits required for the buffer 22 of the device of the present embodiment is obtained as $\pm 7$ bits.

According to Consideration 1, it can be concluded that as long as the above-described preamble length adjustment method is adopted, no preamble disappearance takes place even in the case shown in FIG. 10 or 11. However, the above-described model does not necessarily constitute the worst case in every situation. This is because, referring to FIGS. 10 and 11, even if k (k<n) stations each of which provides the frequency difference $\Delta f$ of positive polarity are successively arranged and the frequency difference $\Delta f$ at the $(k+1)^{th}$ station becomes negative in polarity and the station frequency returns to its initial state (the station frequency becomes the same station frequency as the station frequency F1 of the first station 1), the number of delays (the number of continuous delays), N, which has so far been accumulated is not reset to "0" and the thus-accumulated value is added to the number of delays (the number of continuous delays), N, at the succeeding station.

The following case will be discussed as Consideration 2.

Consideration 2

As a model which can be considered to be more susceptible to preamble disappearance for the above-described reason, reference will be made to a case where a station frequency (i.e., the transmission frequency of serial data) returns to its initial state as shown in FIG. 12(a) and a case where such a station frequency returns to the initial value twice halfway as shown in FIG. 12(b). If the number of times by which the station frequency returns to the initial state halfway increases, the frequency difference $\Delta f$ as a whole increases correspondingly. Accordingly, the adjustment period T becomes shorter (refer to Equation (2)), with the result that a margin for preamble disappearance will become smaller (refer to Equation (4)). However, since the number of times of returns of the station frequency contributes to a decrease in the aforesaid number of adjustment delays (the number of continuous delays), N, the worst case does not necessarily result merely because the number of times of returns of the station frequency increases. It is, therefore, considered that when the number of returns reaches a particular number, the worst case will result.

First of all, the model shown in FIG. 12(a), i.e., the case where the station frequency returns to the initial state once halfway will be considered.

First, from the relationship between FIGS. 11 and 12(a), the following expression is obtained:

$$\Delta f \cdot a1 + \Delta f \cdot a2 - \Delta fb \leq 2\Delta f$$

Even in the worst case, a frequency difference $\Delta fb$ at which the station frequency returns to its initial state halfway is:

$$\Delta fb = (n-2)\Delta f - 2\Delta F$$

Accordingly, if Tb represents the period in which the station frequency returns to the initial state in the manner shown in FIG. 12(a) and the adjustment of the preamble length is reset, from Equation (2), the period Tb is:

$$\begin{aligned} Tb &= 5/m \\ &= 5/(1.5625 \times 0.01 \times \Delta fb) \\ &= 320/\{(n-2)\Delta f - 2\Delta F\} \end{aligned}$$

The frequency difference $\Delta f$ is:

$$\Delta f = (320/Tb + 2\Delta F)/(n-2) \qquad (5)$$

Similarly, from Equation (2), the adjustment period T of the preamble length in this case is:

$$\begin{aligned} Tb &= 5/m \\ &= 5/(1.5625 \times 0.01 \times \Delta f) \\ &= 320/\Delta f \end{aligned}$$

Therefore, if the above equation is arranged on the basis of Equation (5), the following equation is obtained:

$$T = (n-2)/(1/Tb + 2\Delta F/320) \qquad (6)$$

Here, if the maximum number of delays in the preamble length adjustment in this case (the number of continuous delays) is represented as N, as is apparent from FIGS. 12(a) and 13, the maximum number of delays, N, is:

$$N = a1 + a2 - N/Tb$$

Therefore, $$N = (a1 + a2)Tb/(1 + Tb) \qquad (7)$$

If the ratio of the number of adjustment delays, N, to the adjustment period T is obtained to find the aforesaid margin, from Equations (6) and (7), the following equation is obtained:

$$N/T = \{(a1 + a2)Tb/(1 + Tb)\}/\{(n - 2)/(1/Tb + 2\Delta F/320)\}$$
$$= \{1/(1 + Tb)\} + \{2\Delta FTb/320(1 + Tb)\}$$

This equation indicates that a monotonic decrease occurs when $\Delta F < 160$ and that when the frequency returns to $2\Delta F$, i.e., when the minimum value of $Tb = 5/(1.5625 \times 0.01 \times 2\Delta F)$ is taken, the N/T ratio reaches its minimum value (the worst case). Accordingly, in this case, the following equation is obtained:

$$N/T(\min) = 2/(320/2\Delta F + 2) \quad (8)$$
$$= 0.769 \text{ (where } \Delta F = 100 \text{ ppm)}$$

It will be understood that, even in this case, the condition of Equation (4):

$$N/T < 1$$

is satisfied.

The model shown in FIG. 12(b), i.e., the case where the station frequency returns to the initial state twice halfway will now be considered.

This case may be regarded as an extension of the model shown in FIG. 12(a) if each reset period during which the second return occurs is represented by $Tb'$. Accordingly, in this case as well, if the maximum number of delays (number of continuous delays) in preamble length adjustment is represented by N, as is apparent from FIGS. 12(b) and 13, the maximum number of delays, N, is:

$$N = a1 + a2 + a3 - N/Tb - N/Tb'$$

Therefore, $$N = (a1 + a2 + a3)/(1 + 1/Tb + 1/Tb') \quad (9)$$

Here, it is inferred from the model shown in FIG. 12(a) that in the case of the model shown in FIG. 12(b), if:

$$Tb = Tb'$$
$$= 5/(1.5625 \times 0.01 \times 2\Delta F)$$

the aforesaid N/T ratio will take on its minimum value (corresponding to the worst case).

In this case, the maximum number of delays, N, is:

$$N = (a1 + a2 + a3)Tb/(Tb + 2)$$

According to Equation (5), the frequency difference $\Delta f$ is:

$$\Delta f = (640/Tb + 2\Delta F)/(n - 3)$$

In consequence, the margin of this case, i.e., the N/T ratio of the number of adjustment delays, N, to the adjustment period T is:

$$N/T(\min) = \{(a1 + a2 + a3)Tb/(Tb + 2))\}/ \quad (10)$$
$$\{5/(1.5625 \times 0.01 \times \Delta f)\}$$
$$= \{640 + 2\Delta FTb\}/\{320(2 + Tb)\}$$
$$= 3/(320/2\Delta F + 2)$$
$$= 0.833 \text{ (where } \Delta F = 100 \text{ ppm)}$$

As compared with the previously-described example, the N/T ratio approaches N/T = 1, but the condition of Equation (4) is satisfied in this case as well.

If the value of the N/T ratio is generalized on the basis of the result obtained from Consideration 2, the following expression is obtained:

$$N/T(x) = (x+1)/(x+160/\Delta F) \quad (11)$$

where it is assumed that the station frequency returns to its initial state by x times.

According to Equation (11), the value of the N/T ratio approaches "1" with an increase of x, but it will be understood that the value of the N/T ratio never exceeds "1" within the range of $\Delta F < 160$.

In consequence, according to the preamble length adjustment method according to the present invention employing the above-described algorithms, only if the allowable station frequency deviation $\Delta F$ between each station connected to a network is $\pm 100$ ppm or less, it is possible to adjust and set the preamble length PA within the range of 4 to 6 symbols in any case at all times. Therefore, no preamble disappearance takes place.

For confirmation of the result of the above considerations, FIG. 14 shows the results of simulations conducted with the device shown in FIG. 1 on the basis of various kinds of conditions. For the purpose of comparison, FIG. 14 also shows the results of simulations utilizing the conventional "limit smoother" and "centering smoother".

As can be seen from FIG. 14, according to the conventional "limit smoother", even in a simulation condition 1 in which a station clock deviation (station frequency deviation) is random within $\pm 50$ ppm, it is possible that the preamble length PA will be 1 to 3 symbols. In addition, regarding the conventional "centering smoother", 3% of preamble disappearance occurs in the case of a particular combination of station clock deviations as shown in a simulation condition 2. However, with the device of the above-described embodiment, it is possible to maintain the preamble length PA within the range of 4 to 6 symbols in all cycles of every station even in conditionally more unfavorable environments such as the simulation condition 1 or 2 as well as the simulation condition 3 or 4.

It is proved from the foregoing results that the preamble length adjustment method according to the present invention is a highly reliable method which causes neither data destruction nor an excessive decrease in a preamble length.

The above-described embodiment is based on the assumption that: (1) the reference value of the preamble length PA is 5 symbols; (2) the preamble length PA is adjusted within the range of $4 \leq PA \leq 6$; and (3) the buffer 22 has a buffer capacity of $\pm 5$ bits (according to the above-described considerations, $\pm 7$ bits has been obtained as the required minimum number of bits), and from the range of $\pm 5$ bits, $\pm 3$ bits are selected as thresholds to carry out preamble length adjustment. Settings, such as the number of symbols or bits which is determined as a reference value of the preamble length, the adjustment range of the preamble length, the buffer capacity of a buffer used and thresholds for use in carrying out the preamble length adjustment, are not limited to the above-described examples and may be arbitrarily determined according to the actual conditions of a network or station to which the present invention is to be applied.

The device shown in FIG. 1 can also be implemented by an arbitrary technique, whether a software technique or a hardware technique, which can basically satisfy the above-described functions of each part. Accordingly, the method of implementing such a device is not limited to any of the examples shown in FIGS. 4 to 6, and various other techniques can be utilized.

What is claimed is:

1. An independent synchronization type serial data communication device, comprising:

an internal clock source for generating a clock signal of a predetermined frequency for transmission of serial data;

buffer means for temporarily storing the serial data by a first-in/first-out method;

clock deriving means for delivering a transmitted clock from input serial data;

write control means for writing the serial data into said buffer means on the basis of the derived clock;

first detecting means connected to said buffer means for detecting an amount of data which is stored in said buffer means on the basis of a phase difference between a writing clock and a reading clock of the same data;

second detecting means for detecting a length of a preamble contained in the input serial data;

clock phase control means operative on the basis of detection outputs of said first and second detecting means for executing control to delay the phase of a clock generated by said internal clock source in a first case where the detection output of said first detecting means is less than a predetermined amount and where the detection output of said second detecting means is less than a reference value, for executing control to advance the phase of the clock generated by said internal clock source in a second case where the detection output of said first detecting means is greater than the predetermined amount and where the detection output of said second detecting means is greater than the reference value, and for executing control to maintain the phase of the clock generated by the internal clock source at a reference phase for serial data transmission in a case other than the first and second cases; and read control means for reading out the data stored in said buffer means as serial data to be outputted to a succeeding station on the basis of the clock having a controlled phase obtained by any one of said control means.

2. A method of absorbing a cumulative phase difference of serial data added with a predetermined preamble length in each frame and synchronously transmitted to a communication network, the cumulative phase difference being caused by differences in frequencies when a plurality of stations connected to the communication network sequentially transmits the serial data to succeeding stations while reading and writing the data through a FIFO buffer in each station which is operating at an independent frequency, a detecting means connected to said buffer, the method comprising:

a first step of said detecting means detecting a used amount of the buffer in each occasion on the basis of differences in respective clocks for writing;

a second step of detecting the preamble length to be written in the buffer; and a third step of adjusting the preamble length as in the following manner, where $\pm m$ indicates an allowable capacity of the buffer (m is an integer), PAi the length of a preamble written into the buffer, PA the length of a preamble read out from the buffer, n a reference value of the length of the preamble (n is an integer), B the used amount of the buffer memory:

(a) when $-m \leq B \leq +m$ $PA = PAi$ (b) when $B < -m$ if $PAi \leq n$, $PA = PAi + 1$ if $PAi = n + 1$, $PA = PAi$ (c) when $B > +m$ if $PAi \geq n$, $PA = PAi - 1$ if $PAi = n - 1$, $PA = PAi$ the above steps being performed in each of the plurality of stations.

* * * * *